United States Patent
Takahashi et al.

(10) Patent No.: US 7,759,269 B2
(45) Date of Patent: Jul. 20, 2010

(54) DIELECTRIC CERAMIC COMPOSITION AND ELECTRONIC DEVICE

(75) Inventors: Tetsuhiro Takahashi, Yukihonjo (JP);
Yasuo Watanabe, Narita (JP);
Toshihiko Kaneko, Narita (JP);
Masakazu Hosono, Narita (JP); Tatsuya Ishii, Sakura (JP); Saori Takeda, Narita (JP); Taisuke Masuko, Narita (JP)

(73) Assignee: TDK Corporation, Tokyo (JP)

( * ) Notice: Subject to any disclaimer, the term of this patent is extended or adjusted under 35 U.S.C. 154(b) by 125 days.

(21) Appl. No.: 12/232,799

(22) Filed: Sep. 24, 2008

(65) Prior Publication Data

US 2009/0086407 A1 Apr. 2, 2009

(30) Foreign Application Priority Data

Sep. 28, 2007 (JP) .............................. 2007-256061
Feb. 26, 2008 (JP) .............................. 2008-044449

(51) Int. Cl.
*C04B 35/468* (2006.01)
*H01G 4/06* (2006.01)

(52) U.S. Cl. ..................................... 501/138; 501/139

(58) Field of Classification Search ................. 501/138, 501/139; 361/321.4
See application file for complete search history.

(56) References Cited

U.S. PATENT DOCUMENTS

| 5,397,753 | A | * | 3/1995 | Nishiyama et al. | 501/138 |
| 6,051,516 | A | * | 4/2000 | Mizuno et al. | 501/138 |
| 6,380,116 | B1 | * | 4/2002 | Okamatsu et al. | 501/138 |
| 6,522,521 | B2 | * | 2/2003 | Mizuno et al. | 361/321.4 |
| 2008/0226944 | A1 | * | 9/2008 | Aman et al. | 428/697 |

FOREIGN PATENT DOCUMENTS

JP A-11-92220 4/1999

* cited by examiner

*Primary Examiner*—Karl E Group
(74) *Attorney, Agent, or Firm*—Oliff & Berridge PLC (57) ABSTRACT

A dielectric ceramic composition of the invention comprises: $BaTiO_3$ as a main component, MgO: 0.50 to 3.0 moles, MnO: 0.05 to 0.5 moles, oxide ($RE^1_2O_3$) of element selected from Sm, Eu, and Gd, oxide ($RE^2_2O_3$) of element selected from Tb and Dy, oxide ($RE^3_2O_3$) of element selected from Y, Ho, Er, Yb, Tm and Lu, $BaZrO_3$: 0.20 to 1.0 moles, and oxide of element selected from V, Ta, Mo, Nb, and W: 0.05 to 0.25 moles as subcomponents wherein each subcomponent is calculated as a conversion of an oxide or composite oxide, with respect to 100 moles of the main component, and contents of said $RE^1_2O_3$, $RE^2_2O_3$ and $RE^3_2O_3$ satisfy $RE^1_2O_3 < RE^2_2O_3$ and $(RE^1_2O_3 + RE^2_2O_3) \leq RE^3_2O_3$.

14 Claims, 2 Drawing Sheets

DIELECTRIC CERAMIC COMPOSITION AND ELECTRONIC DEVICE

BACKGROUND OF THE INVENTION

1. Field of the Invention

The present invention relates to dielectric ceramic composition, used such as for dielectric layer of multilayer ceramic capacitor, and electronic device using the dielectric ceramic composition as dielectric layer.

2. Description of the Related Art

A multilayer ceramic capacitor, an example of electronic devices, for example, is manufactured by firing a green chip obtained by stacking alternately ceramic green sheets comprising pre-determined dielectric ceramic composition and internal electrode layers in a pre-determined pattern to be integrated. Since the internal electrode layer of multilayer ceramic capacitor is integrated with the ceramic dielectric body by firing, a material not reacted with the ceramic dielectric body needs to be selected. Therefore, as a material constituting the internal electrode layer, there has been no choice but using expensive noble metal such as platinum and palladium.

On the other, dielectric ceramic composition wherein inexpensive base metal such as nickel and copper can be used has been recently developed to attain significant cost reduction. Said dielectric ceramic composition is described such as in Japanese Unexamined Patent Application H11-92220: 100 parts by weight of main component comprising $\{BaO\}_m TiO_2 + M_2O_3 + R_2O_3 + BaZrO_3 + MgO + MnO$ wherein $M_2O_3$ is $Sc_2O_3$ and/or $Y_2O_3$ and $R_2O_3$ is selected at least one from $Eu_2O_3$, $Gd_2O_3$, $Tb_2O_3$ and $Dy_2O_3$, and 0.2 to 3.0 parts by weight of subcomponent comprising $Li_2O$—(Si, Ti)$O_2$—MO wherein MO is $Al_2O_3$ and/or $ZrO_2$ or $SiO_2$—$TiO_2$—XO wherein XO is selected at least one from BaO, CaO, SrO, Mgo, ZnO and MnO.

An object of the above-described Japanese Unexamined Patent Application H11-92220 is to provide multilayer ceramic capacitor which shows good CR product under a high electric field strength as well as good DC bias characteristic and weatherability. However, according to the above-described Japanese Unexamined Patent Application H11-92220, specific permittivity of its capacitor is as low as 1500, resulting in a problem of downsizing and increasing capacitance of the capacitor. Moreover, thickness of inter layers between dielectric layers in examples of said H11-92220 is 30 μm, resulting in a problem of making said dielectric layers thinner.

Demands for downsizing and increasing capacitance of multilayer ceramic capacitor is rapidly growing due to the progress of downsizing, higher functioning and higher performance of recent electronic equipments. In order to meet these demands, measures such as improving dielectric materials to obtain higher specific permittivity or making dielectric layer thinner to obtain higher number of laminated layers are often taken, however, it becomes difficult to secure reliabilities, e.g. life expectancy, as said dielectric layers become thinner. Further, downsizing and higher functioning leads to higher density in electronic circuit, which develops fever at use and reveals higher temperature.

Furthermore, opportunities to use electronic devices, such as portable devices, outdoors are increasing. Therefore, demand for less change in characteristics by temperature change is more growing than the past. Multilayer ceramic capacitor is required to maintain high specific permittivity, e.g. 3500 or higher, with improved capacitance-temperature characteristic even when dielectric layer is made thinner.

Capacitor of the above-described H11-92220, however, did not consider making dielectric layers thinner, therefore, it was difficult to obtain good temperature characteristic and maintain high specific permittivity simultaneously when said dielectric layers are made thinner.

SUMMARY OF THE INVENTION

An object of the present invention, in order to solve the above conventional problems, is to provide dielectric ceramic composition which shows high specific permittivity, good temperature characteristic, CR product, break-down voltage, DC bias characteristic, accelerated lifetime of high temperature . . . etc. Further, the other object of the present invention is to provide electronic device, such as multilayer ceramic capacitor comprising dielectric layers made from dielectric ceramic composition and internal electrode layers.

Inventors of the invention, in order to obtain the above object, had carried out every examination to find that the object can be obtained by using the specific composition of dielectric layer ceramic composition, which had brought the invention to completion.

To attain the above problems, a dielectric ceramic composition according to a first aspect of the invention comprises:

$BaTiO_3$ as a main component

MgO: 0.50 to 3.0 moles

MnO: 0.05 to 0.5 moles oxide of element ($RE^1{}_2O_8$) selected from Sm, Eu, and Gd oxide of element ($RE^2{}_2O_8$) selected from Th and Dy oxide of element ($RE^3{}_2O_3$) selected from Y, Ho, Er, Yb, Tm and Lu $BaZra_3$: 0.20 to 1.0 moles and oxide of element selected from V, Ta, Mo, Nb, and W: 0.05 to 0.25 moles as subcomponents wherein each sub component is calculated as a conversion of an oxide or composite oxide, with respect to 100 moles of main component, and contents of said $RE^1{}_2O_3$, $RE^2{}_2O_3$ and $RE^3{}_2O_3$ satisfy $$RE^1{}_2O_3 < RE^2{}_2O_3 \text{ and}$$

$$(RE^1{}_2O_3 + RE^2{}_2O_3) \leq RE^3{}_2O_3.$$

Preferably, according to a first aspect of the invention, contents of $RE^1{}_2O_3$. $RE^2{}_2O_3$ and $RE^3{}_2O_3$ with respect to 100 moles of main component satisfy: $0.30 \text{ moles} \leq (RE^1{}_2O_3 + RE^2{}_2O_3 + RE^3{}_2O_3) \leq 1.50$ moles.

Preferably, according to a first aspect of the invention, with respect to 100 moles of main component, the dielectric ceramic composition further comprises 0.40 to 2.0 moles of sintering aid.

Preferably, according to a first aspect of the invention, $RE^1$ is Gd, $RE^2$ is Dy and $RE^3$ is Y.

To attain the above problems, a dielectric ceramic composition according to a second aspect of the invention comprises:

$BaTiO_3$ as a main component

MgO: 0.50 to 2.50 moles

MnO: 0.05 to 0.35 moles $RE^4{}_2O_3$ ($RE^4$ being rear earth element excluding Gd): 0.40 to 1.60 moles $Gd_2O_3$: 0.03 to 0.10 moles, excluding 0.10 moles $BaZrO_3$: 0.20 to 0.70 moles, and oxide of element selected from V, Ta, Mo, Nb, W: 0.02 to 0.15 moles as sub components, wherein each sub component, is calculated as a conversion of an oxide or composite oxide, with respect to 100 moles of main component.

Preferably, according to a second aspect of the invention, $RE^4$ is selected at least one element selected from Y, Ho, Dy, Er, and Yb.

Preferably, according to a second aspect of the invention, with respect to 100 moles of main component, the dielectric ceramic composition further comprises 0.40 to 1.50 moles of sintering aid. More preferably, said sintering aid comprises at least one selected from oxides of Si, B, and Li.

Preferably, dielectric ceramic compositions according to both first and second aspect of the invention show Ba/Ti, a mole ratio of Ba and Ti in $BaTiO_3$, of 0.997 to 1.003 and c/a, a ratio of lattice constant of c-axis and the same of a-axis in $BaTiO_3$ crystal lattice, of 1.0095 or more.

Electronic device according to the present invention comprises dielectric layers, made from anyone of the dielectric ceramic composition described above, and internal electrode layers. An electronic device according to the present invention is not particularly limited, and there may be mentioned a multilayer ceramic capacitor, piezo element, chip inductor, chip varistor, chip thermistor, chip resistor and other surface mount chip-type electronic devices (SMD).

According to dielectric ceramic composition of the invention, even when the thickness of dielectric ceramic layer is made to 0.5 to 2.0 μm, it is possible to maintain high specific permittivity, e.g. 3500 or higher, satisfy capacitance-temperature characteristic, e.g. X5R or X6S characteristics of EIA standard, and show good CR product, IR lifetime, breakdown voltage, and DC bias characteristic.

Accordingly, dielectric layers made from above-described dielectric ceramic composition in electronic device, especially in multilayer ceramic capacitor, are made thinner. And with the superior characteristics of the dielectric layers, it is possible to increase capacitance and assure highly-reliable device even under a severe condition in use.

BRIEF DESCRIPTION OF THE DRAWINGS

Hereinafter, the present invention will be described based on embodiments shown in drawings.

DESCRIPTION OF THE PREFERRED EMBODIMENTS

First Embodiment

First embodiment relates to a first aspect of the invention.

Figure 1:
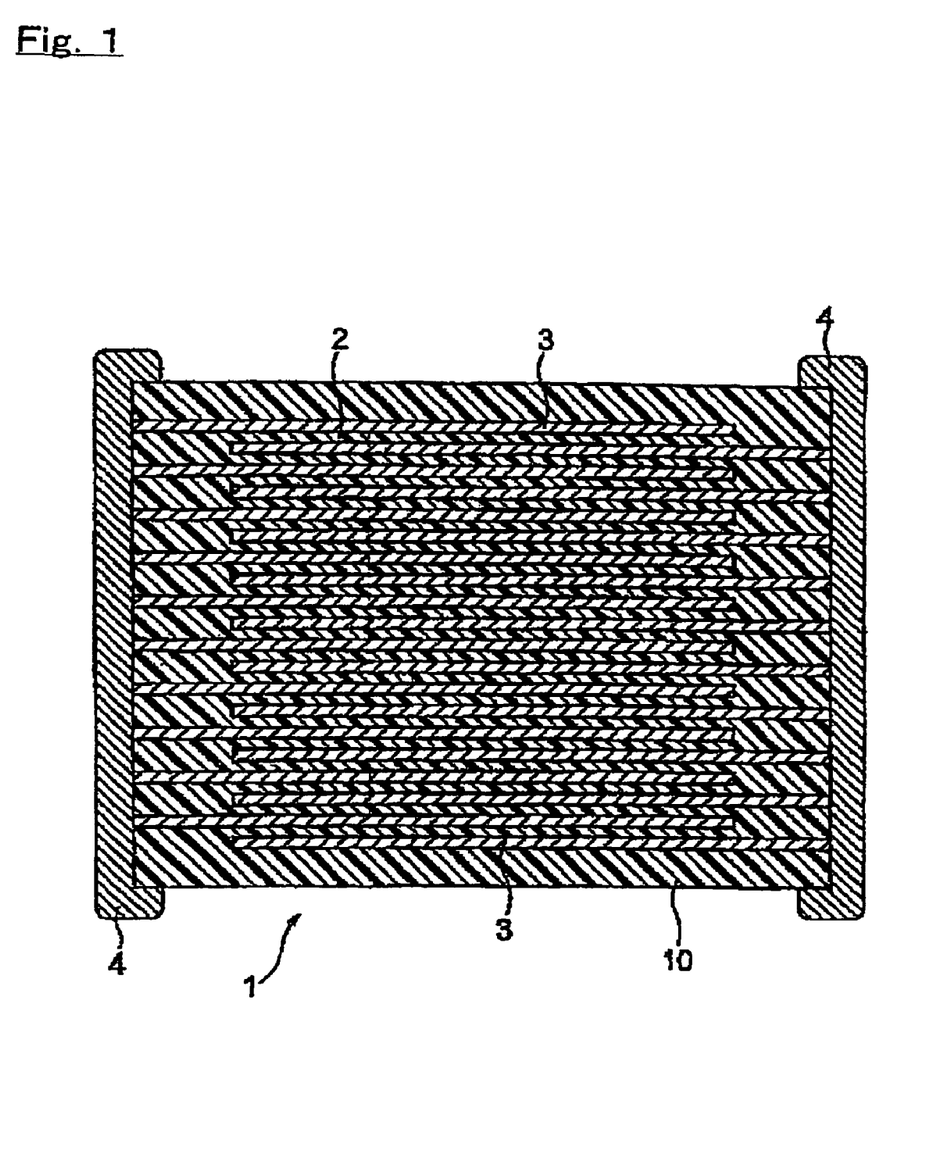
FIG. 1 is a cross-sectional view of a multilayer ceramic capacitor according to an embodiment of the present invention.

As shown in FIG. 1, a multilayer ceramic capacitor 1 according to an embodiment of the present invention comprises a capacitor device body 10 wherein dielectric layer 2 and internal electrode layer 3 are alternately stacked. At the both end portions of the capacitor device body 10, a pair of external electrodes 4, connected with internal electrode layers 3 alternately stacked inside the device body 10, is formed. The shape of the capacitor device body 10 is not particularly limited, and is normally rectangular parallelepiped. Also, its dimension is not particularly limited, and may be properly changed as usage.

The internal electrode layers 3 are stacked so that each end face is alternately exposed to a surface of the two opposed end portions of the capacitor device body 10. The pair of external electrodes 4 is formed at both end portions of the capacitor device body 10, and connected with the exposed end faces of the alternately-stacked internal electrode layers 3 to form a capacitor circuit.

Dielectric layer 2 includes dielectric ceramic composition of the present invention.

Dielectric ceramic composition according to the present invention comprises: $BaTiO_3$ as a main component, oxide of element ($RE^1{}_2O_3$) selected from MgO, MnO, Sm, Eu, and Gd, oxide of element ($RE^2{}_2O_3$) selected from Th and Dy, oxide of element ($RE^3{}_2O_3$) selected from Y, Ho, Er, Yb, Tm and Lu, $BaZrO_3$, and oxide of element selected from V, Ta, Mo, Nb, and W as subcomponents. In this case, oxygen (O) amount may slightly deviate from stoichiometric composition in the above formula.

$BaTiO_3$, a main component, has perovskite-type crystal structure wherein only Ba is present in "A" site and Ti in "B" site. In the present embodiment, Ba/Ti, a mole ratio of Ba and Ti is preferably, 0.997 to 1.003, more preferably, 0.998 to 1.002, most preferably 0.998 to 1.001. When said Ba/Ti is too small, abnormal particle growth in dielectric layer at firing tends to occur and capacitance-temperature characteristic, DC bias characteristic, and IR lifetime tends to deteriorate. On the other hand, when Ba/Ti is too large, not only its specific permittivity deteriorates, but also sintering characteristic tends to deteriorate and firing temperature tends to increase, which cause structural deficiencies, such as delamination and crack.

The above perovskite-type crystal structure changes its structure by temperature. The structure shows tetragonal system at a room temperature equal to or lower than Curie temperature, and cubic system at Cuie temperature or more. Each crystal axis, a, b, and c axis, in cubic system shows the same lattice constant, however, in tetragonal system, one of the axes, c axis, shows larger lattice constant than the other axes (a axis (=b axis)). Therefore, in tetragonal system, each ion ($Ba^{2+}$, $Ti^{4+}$ and $O^{2-}$) of crystal displaces, center of positive and negative charges moves, and spontaneous polarization occur. As a result, $BaTiO_3$ of tetragonal system show higher specific permittivity than $BaTiO_3$ of cubic system. In the present embodiment, c/a, a ratio of lattice constant of c-axis and the same of a-axis is preferably 1.0095 or more, more preferably 1.0097 or more, most preferably 1.0098 or more. When c/a is too small, higher specific permittivity tends to become difficult to attain and dielectric particles after firing tends to become difficult to form distinct core-shell structure, since the reaction of $BaTiO_3$ and subcomponents is difficult prohibit.

Note that not all of $BaTiO_3$ particles are required to satisfy the above range of c/a. For instance, $BaTiO_3$ particles of tetragonal system and the same of cubic system can both be in $BaTiO_3$ material powder. Only the amount of $BaTiO_3$ particles of tetragonal system is relatively high with respect to the whole $BaTiO_3$ particles and c/a is within the above range.

MgO as subcomponent has an effect of flattening the capacitance-temperature characteristic and, with respect to 100 moles of the main component; its content is 0.50 to 3.0 moles, preferably 1.0 to 3.0 moles, more preferably 1.5 to 2.5 moles when calculated as a conversion of MgO. When content of MgO is too small, rapid growths of the particles at sintering occur and desired capacitance temperature characteristic and DC bias characteristic cannot be attained. On the other hand, when content of MgO is too large, specific permittivity tends to decrease and temperature characteristic tends to deteriorate.

MnO has effects to promote sintering, increase IR, and improve IR lifetime and, with respect to 100 moles of the main component; its content is 0.05 to 0.5 moles, preferably 0.05 to 0.4 moles, more preferably 0.10 to 0.35 moles when calculated as a conversion of MnO. When content of MnO is too small insulation resistance (IR) greatly lowers and CR product as well as reliability decrease. On the other hand, when content of MnO is too large, insulation resistance (IR) lowers and specific permittivity and sintering characteristic tend to deteriorate.

$RE^1$, $RE^2$ and $RE^3$ are groups of rare earth elements classified by their ion-radius. $RE^1$ is an element selected from groups Sm, Eu and Gd, $RE^2$ is an element selected from groups Th and Dy, and $RE^3$ is an element selected from Y, Ho, Er, Yb, Tm and Lu.

Present invention is characterized in combining 3 kinds of oxides of rare earths, selected from groups $RE^1$, $RE^2$ and $RE^3$, respectively wherein its content is $RE^1{}_2O_3 < RE^2{}_2O_3O$ and $(RE^1{}_2O_3 + RE^2{}_2O_3) \leqq RE^3{}_2O_3$.

With respect to 100 moles of main component, total contents of $RE^1{}_2O_3$, $RE^2{}_2O_3$, and $RE^3{}_2O_3$ is preferably 0.30 to 1.50 moles, more preferably 0.30 to 1.25 moles.

With the contents above, it becomes possible to improve the reliability and control diffusion of the rare earths into core. The same characteristics can be attained even when an element is changed but selected from the same group of rare earth metals of $RE^1$, $RE^2$ or $RE^3$, however, it is preferable that $RE^1$ is Gd, $RE^2$ is Dy and $RE^3$ is Y.

When addition amount of $RE^1{}_2O_3$ exceeds the same of $RE^2{}_2O_3$ capacitance-temperature characteristic change rate at high temperature deteriorates. Further, specific permittivity tends to lower due to the depression of $RE^1{}_2O_3$ in core.

When total content of $RE^1{}_2O_3$ and $RE^2{}_2O_3$ exceeds the content of $RE^3{}_2O_3$, particle growth tends to occur together with deterioration of IR lifetime and capacitance temperature characteristic.

When total content of $RE^1{}_2O_3$, $RE^2{}_2O_3$ and $RE^3{}_2O_3$ is less than 0.30 moles with respect to 100 moles of main component, it is ineffective against the improvement of IR lifetime, while when more than 1.50 moles, sintering characteristic tends to deteriorate, firing temperature tends to increase, specific permittivity tends to reduce, and IR lifetime and CR product also tends to deteriorate.

$BaZrO_3$ has an effect to improve specific permittivity, dielectric loss, and capacitance-temperature characteristic. Said Gd is solid-dissolved in $BaTiO_3$ particles, therefore, Zr of $BaZrO_3$ will not be diffused inside the $BaTiO_3$ particles and tends to form "Zr included shell-layer" outside the $BaTiO_3$ particles. As a result, $BaZrO_3$ is able to exert the above effects.

In the present embodiment, it is preferable to use in form of $BaZrO_3$, a composite oxide form, as subcomponent. When used in form of BaO and $ZrO_2$ as subcomponent, Zr will be diffused in $BaTiO_3$ particles more than required, which leads to deterioration in IR lifetime.

Content of $BaZrO_3$ is 0.20 to 1.0 moles, preferably 0.20 to 0.70 moles, more preferably 0.20 to 0.50 moles when calculated as a conversion of $BaZrO_3$. When content of $BaZrO_3$ is too small specific permittivity tends to reduce as well as insulation resistance (IR) and IR lifetime tends to deteriorate. On the other hand, when too large, capacitance-temperature characteristic as well as DC bias characteristic tends to deteriorate. Note that $BaZrO_3$ will be detected as Zr, not as $BaZrO_3$.

Oxide of an element selected from V, Ta, Mo, Nb and W has an effect to improve IR lifetime. Within these oxides, V oxide, especially $V_2O_5$, is preferably used. Contents of V, Ta, Mo, Nb and W oxides are, with respect to 100 moles of main component, 0.05 to 0.25 moles, preferably 0.05 to 0.20 moles, more preferably 0.05 to 0.15 moles when calculated as a conversion of $V_2O_5$, $Ta_2O_5$, $MoO_3$, $Nb_2O_5$ and $WO_3$, respectively.

When content of these oxides are too small, improvement in reliability (IR lifetime) cannot be attained. On the other hand, when too large, insulation resistance tends to be greatly reduced.

Preferably, in the present embodiment, dielectric ceramic composition of the invention further comprises sintering aid. Said sintering aid can be various compounds which operate as sintering aid. $SiO_2$, $Li_2O$ and $B_2O_3$ can be exemplified as said compounds; however, $SiO_2$ is preferable in the invention. Content of said sintering aid is preferably 0.40 to 2.0 moles, more preferably 0.40 to 1.75 moles, most preferably 0.40 to 1.50 moles with respect to 100 moles of main component. When content of said sintering aid is too small, sintering of dielectric ceramic composition become insufficient, and specific permittivity tends to reduce as well as insulation resistance, break-down voltage, and IR lifetime tends to be greatly reduced. On the other hand, when content of said sintering aid is too large, specific permittivity tends to be reduced.

Note that in the present description, each oxide or composite oxide constituting the main component and subcomponent is described in stoichiometric composition, but oxidation state of each oxide or composite oxide may be slightly deviate from the stoichiometric composition. Note that the above ratio of each subcomponent is obtained by calculating amounts of metals included in the oxide or composite oxide constituting the respective subcomponent as a conversion of the above stoichiometric composition of the oxide or composite oxide.

Thickness of dielectric layer 2 is not particularly limited, but preferably 2.0 μm or less, more preferably 1.0 μm or less. The minimum of the thickness is not particularly limited, but approximately 0.5 μm. According to dielectric ceramic composition of the invention, even when thickness of inter layer is 0.5 to 2.0 μm, dielectric layers showing 3500 or more of specific permittivity, 1500 Ω·F or more of CR product at 20° C. under high electric field intensity (4 V/μm), 100 V/μm or more of break-down voltage, 35% or less of capacitance decreasing rate while applying 2 V/μm, and 5 or more hours to reach $10^4 \Omega$ for insulation resistance of accelerated lifetime when applying voltage of 10 V/μm at 150° C., can be formed.

Number of laminated layers of dielectric layer 2 is not particularly limited, but preferably 200 or more, more preferably 400 or more.

An average crystal particle size of dielectric particles included in dielectric layer 2 is not particularly limited, and can be suitably determined from such as 0.1 to 0.5 μm, preferably 0.2 to 0.3 μm considering the thickness of dielectric layer 2. The average crystal particle size of dielectric particles included in dielectric layer is measured by following procedures. First, the obtained capacitor sample is cut at a plane perpendicular to internal electrode and the cut surface is grinded. Chemical etching is done to the grinded surface, and being observed with scanning electron microscope (SEM), the average crystal particle size is calculated with the code method supposing that the dielectric particles are globular formed.

As a conducting material included in the internal electrode layer 3, although not particularly limited, base metal can be used since constituent materials of the dielectric layer 2 have resistance to reduction. The base metal used as the conducting material is preferably Ni or Ni alloy. As the Ni alloy, it is preferable to use an alloy of Ni with one or more elements selected from Mn, Cr, Co and Al. The content of Ni in the alloy is preferably 95 wt % or more.

As a conducting material included in the external electrode 4, although not particularly limited, in the present invention, inexpensive Ni, Cu or their alloys can be used. The thickness of the external electrode 4 may be properly determined in accordance with application, etc. but normally 10 to 50 μm or so is preferable.

The multilayer ceramic capacitor made from dielectric ceramic composition of the present invention is produced, as with traditional multilayer ceramic capacitors, by forming a green chip by a usual printing method or sheet method wherein a paste is used, followed by firing, and printing or transferring an external electrode, followed by firing. Hereinafter, the production method will be specifically described.

Figure 2:
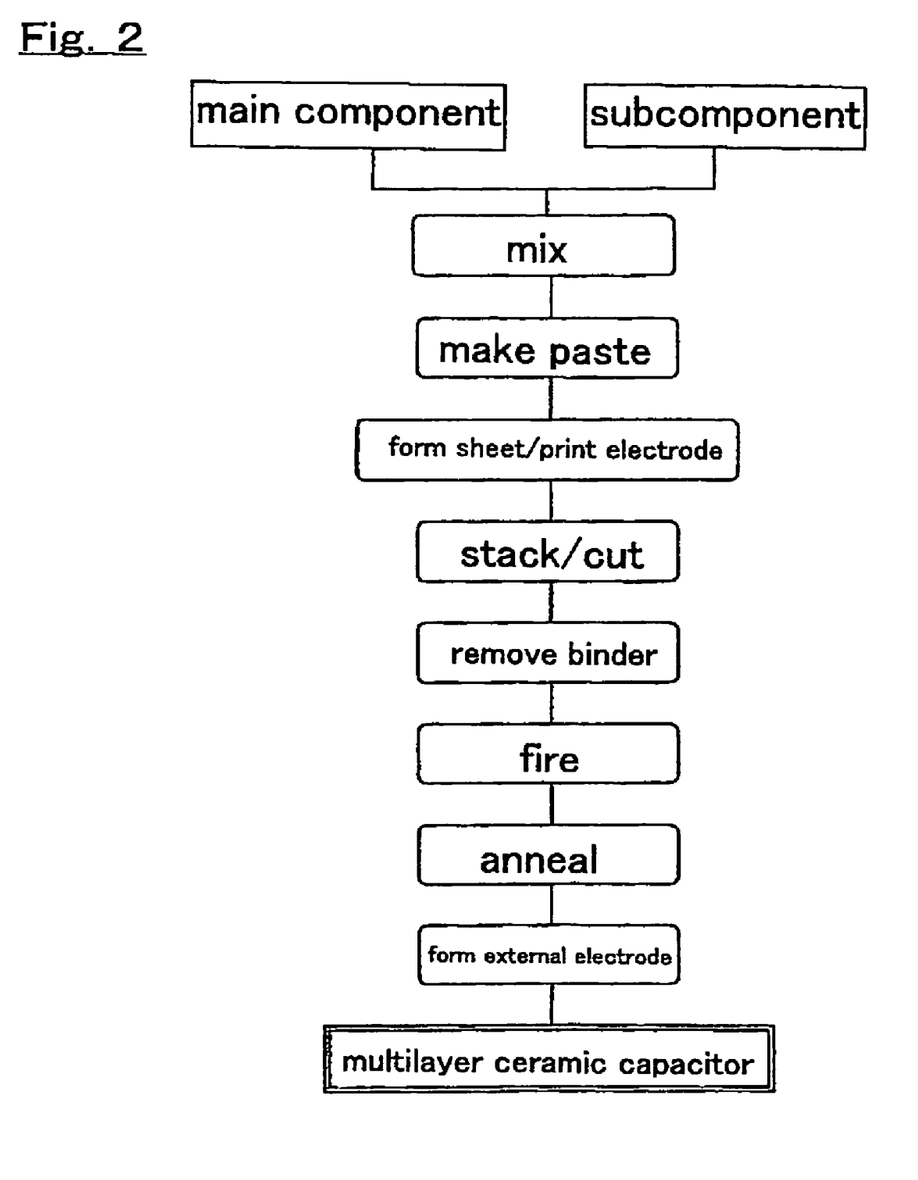
FIG. 2 is a flow chart of manufacturing method of a multilayer ceramic capacitor according to an embodiment of the present invention.

First, dielectric ceramic composition powder included in dielectric layer paste is prepared. As shown in FIG. 2, materials of main component and that of subcomponent are mixed by ball mill or so to obtain dielectric ceramic composition powder.

$BaTiO_3$ is used for material of main component. Manufacturing method of this material of main component is not particularly limited and it can be done by calcinating a mixture of precipitation, obtained from coprecipitation method, sol-gel method, alkali hydrolysis method, and precipitation mixed method . . . etc., and subcomponent material.

As subcomponent material the above oxides, a mixture of the oxides or their compound oxides can be used, and besides those materials, it can also suitably selected from various kinds of compounds such as carbonates, oxalates, nitrates, hydroxides, organic metals or their mixtures which all become the above oxides or their compound oxides by firing.

Manufacturing method of the above dielectric ceramic composition powder is not particularly limited and, other than the above method, it can also be a method wherein subcomponent material is mixed to a starting material of main component and dielectric ceramic composition powder is obtained at the same time main component is manufactured by solid phase method and liquid phase method or so.

The content of each compound in the obtained dielectric ceramic composition powder may be determined so as to have the above composition of the dielectric ceramic composition after firing.

Before forming paste, average particle diameter of $BaTiO_3$, a main component material, is preferably 0.25 μm or less, more preferably 0.15 to 0.25 μm. By using this material having small average particle diameter, amount of $BaTiO_3$ particles of tetragonal system, which is more stable than the same of cubic system, in $BaTiO_3$ material powder becomes large. Accordingly, material powder is highly characterized by the features of tetragonal system, which makes it possible to obtain a desired range of c/a, a ratio of lattice constant of c-axis and the same of a-axis.

Further, an average particle diameter of subcomponent material is preferably 0.05 to 0.20 μm, more preferably 0.05 to 0.15 μm. By mixing main component material and subcomponent material, uniform sintering at firing is performed, which prevents crack and delamination and improves heat resistance of element as well.

Further, when minimum of grain size distribution of dielectric ceramic composition powder is preferably 0.051 μm or more, more preferably 0.05 to 0.10 μm, abnormal particle growth and deterioration of capacitance-temperature characteristic can be prevented. According to the above dielectric ceramic composition powder, its grain size distribution is sharp and that green sheet suitable for thin layer can be manufactured. And even when thickness of the layer is made thinner to 0.5 to 2.0 μm, stable electrical characteristic can be obtained.

An average particle diameter of material powder and particle distribution of the same are determined by following procedure. The powder is taken by a 30000 power SEM picture, area of 1000 particles, a random selection from the powder, are calculated, diameters of the particles are calculated by supposing that the particles are globular form, and said average particle diameter and particle distribution is determined from the diameters.

Materials of above main component and the subcomponent can further be calcined. Calcination conditions are, for instance, calcination temperature of preferably 800 to 1100° C. and calcinations time of preferably 1 to 4 hours.

As shown in FIG. 2, the obtained dielectric ceramic composition powder is made to a paste to prepare dielectric layer paste. The dielectric layer paste may be an organic paste obtained by kneading dielectric ceramic composition powder and organic vehicle, or a water-based paste.

The organic vehicle is obtained by dissolving a binder in an organic solvent. The binder used in the organic vehicle is not particularly limited, and may be properly selected from a variety of usual binders such as ethylcellulose and polyvinyl butyral. Also, the organic solvent used is not particularly limited, and may be properly selected from a variety of organic solvents such as terpineol, butyl carbitol, acetone and toluene in accordance with a method used such as a printing method and sheet method.

Also, when using water-based dielectric layer paste, dielectric materials can be kneaded with a water-based vehicle obtained by dissolving an aqueous binder and dispersant in water. The aqueous binder used for water-based vehicle is not particularly limited, and for example, polyvinyl alcohol, cellulose, aqueous acrylic resin, etc., may be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle.

An external electrode paste may be obtained as with the above internal electrode layer paste.

The content of organic vehicle in each of the above paste is not particularly limited, and may be usual content, for example, 1 to 5 wt % or so of the binder and 10 to 50 wt % or so of the solvent. Also, in each paste, there may be included additives selected from a variety of dispersants, plasticizer, dielectric, insulators, etc., if needed. The total amount of these is preferably 10 wt % or less.

When using the printing method, dielectric layer paste and internal electrode layer paste are alternately printed on a substrate such as PET to form layers, and after cutting to a predetermined shape, a green chip is obtained by removing from the substrate.

Also, when using the sheet method, a green sheet is formed by using dielectric layer paste, internal electrode layer paste is printed thereon, and then, these are stacked to form a green chip.

Before firing, the green chip is subject to binder removal treatment. Binder removal treatment may be properly determined in accordance with a type of the conducting material in the internal electrode layer paste. When using base metal including Ni and Ni alloy as the conducting material oxygen partial pressure in the firing atmosphere is preferably $10^{-45}$ to $10^5$ Pa. When the oxygen partial pressure is below the above range, an effect to remove binder will be decreased. Also, when the oxygen partial pressure exceeds the above range, the internal electrode layer tends to be oxidized.

Additional binder removal conditions include temperature rising rate of preferably 5 to 300° C./hour, more preferably 10 to 100° C./hour, holding temperature of preferably 180 to 400° C., more preferably 200 to 350° C., and temperature holding time of preferably 0.5 to 24 hours, more preferably 2 to 20 hours. Also, firing atmosphere is preferably the air or reduced atmosphere. And as atmosphere gas under reduced atmosphere, for example, a wet mixed gas of $N_2$ and $H_2$ may preferably be used.

The atmosphere at firing of the green chip may be properly determined in accordance with a type of the conducting material in the internal electrode layer paste. When using base metal including Ni and Ni alloy as the conducting material, oxygen partial pressure in the firing atmosphere is preferably $10^{-9}$ to $10^{-4}$ Pa. When the oxygen partial pressure is below the above range, abnormal sintering may be caused in the conducting material in the internal electrode layer, resulting in an electrode breaking. Also, when the oxygen partial pressure exceeds the above range, the internal electrode layer tends to be oxidized.

Holding temperature at firing is preferably 1000 to 1400° C., more preferably 1200 to 1300° C. According to the invention, content of oxide of rear earth element as subcomponent is relatively low; therefore, firing temperature can be relatively low. When the holding temperature at firing is below the above range, densification may be insufficient. When it exceeds the above range, abnormal sintering of the internal electrode layer may cause an electrode breaking, capacitance-temperature characteristics may deteriorate due to dispersion of the material constituting the internal electrode layer, and the dielectric ceramic composition may be easily reduced.

Additional firing conditions include: temperature rising rate of preferably 50 to 500° C./hour, more preferably 200 to 300° C./hour; temperature holding time of preferably 0.5 to 8 hours, more preferably 1 to 3 hours; and cooling rate of preferably 60 to 500° C./hour, more preferably 200 to 300° C./hour. Also, firing atmosphere is preferably a reducing atmosphere, and as atmosphere gas, for example, a wet mixed gas of $N_2$ and $H_2$ may be used.

After firing in a reducing atmosphere, it is preferable to anneal the capacitor device body. The annealing is a treatment for reoxidizing the dielectric layer and can make IR lifetime significantly longer, so that the reliability is improved.

The oxygen partial pressure in the annealing atmosphere is preferably $10^{-3}$ Pa or more, more preferably $10^{-2}$ to 10 Pa. When the oxygen partial pressure is below the above range, it may be difficult to reoxidize the dielectric layer. When it exceeds the above range, the internal electrode layer tends to be further oxidized.

Holding temperature at annealing is preferably 110° C. or less, particularly 500 to 1100° C. is preferable. When the holding temperature is below the above range, the dielectric layer may not be sufficiently oxidized, often resulting in lowering IR and shortening IR lifetime. On the other hand, when the holding temperature exceeds the above range, the internal electrode layer is not only oxidized to reduce the capacitance, but also reacts with the dielectric body itself, which may easily cause deteriorated capacitance-temperature characteristics, reduced IR, and reduction in IR lifetime. Note that the annealing may consist of a temperature rising process and temperature falling process. Namely, the temperature holding time may be zero. In this case, the holding temperature is same as the maximum temperature.

Additional annealing conditions include: temperature holding time of preferably 0 to 20 hours, more preferably 2 to 10 hours; and cooling rate of preferably 50 to 500° C./hour, more preferably 100 to 300° C./hour. Also, the atmosphere gas at annealing is preferably a wet $N_2$ gas, for example.

In the above-mentioned binder removal treatment, firing and annealing, a wetter, etc., may be used to wet the $N_2$ gas and mixed gas, for example. In this case, the water temperature is preferably 5 to 75° C. or so.

Also, the binder removal treatment, firing and annealing may be performed continuously or independently.

Thus obtained capacitor device body is then subject to end surface polishing, for example, by barrel-polishing or sand blasting, and the external electrode paste is pasted thereon, followed by firing, so that the external electrode 4 is formed. Firing conditions of external electrode paste are preferably 600 to 800° C. for 10 minutes to 1 hour in a wet mixed gas of $N_2$ and $H_2$, for example. If needed, a covering layer may be formed on the surface of the external electrode 4 by plating, etc.

Thus produced multilayer ceramic capacitor of the present invention is mounted on the printed-circuit board, etc., by soldering, etc., to be used in a variety of electronic devices, etc.

Second Embodiment

Second embodiment relates to a second aspect of the invention.

In the present embodiment, multilayer ceramic capacitor is manufactured as with the first embodiment except for the followings.

Dielectric layer 2 of the present embodiment includes dielectric ceramic composition of the present invention.

Dielectric ceramic composition according to the present invention comprises: $BaTiO_3$ as a main component, oxide of rare earth element except for MgO, MnO and Gd($RE^4_2O_3$), $Gd_2O_3$, $BaZrO_3$, and oxide of element selected from V, Ta, Mo, Nb and W as subcomponents. In this case, oxygen (O) amount may slightly deviate from stoichiometric composition in the above formula.

MgO as subcomponent has an effect of flattening the capacitance-temperature characteristic and, with respect to 100 moles of main component; its content is 0.50 to 2.50 moles, preferably 0.75 to 2.25 moles, more preferably 1.00 to 2.00 moles when calculated as a conversion of MgO. When content of MgO is too small, rapid growths of the particles at sintering occur and desired capacitance temperature characteristic and DC bias characteristic cannot be attained. On the other hand, when content of MgO is too large, specific permittivity tends to decrease and temperature characteristic tends to deteriorate.

MnO has effects to promote sintering, increase insulation resistance IR, and improve IR lifetime and, with respect to 100 moles of main component; its content is 0.05 to 0.35 moles, preferably 0.10 to 0.325 moles, more preferably 0.15 to 0.30 moles when calculated as a conversion of MnO. When content of MnO is too small insulation resistance (IR) greatly lowers and CR product and reliability also decrease. On the other hand, when content of MnO is too large, insulation resistance (IR) lowers and specific permittivity and sintering characteristic tend to deteriorate.

Oxide of rare earth element excluding Gd ($RE^4_2O_3$) has an effect to improve IR lifetime. $RE^4_2O_3$ is not particularly limited and may be oxides of various rare earth elements, especially oxide of one or more element selected from Y, Dy, Ho, Er and Yb is preferable, and oxide of Y is most preferable. The same effect can be obtained when these rare earth elements are used alone or in combination form. Content of the oxide of rare earth element except for Gd is 0.40 to 1.50 moles, preferably 0.50 to 1.20 moles, more preferably 0.60 to 1.00 moles when calculated as a conversion of $RE^4_2O_3$ with respect to 100 moles of main component. When content of $RE^4_2O_3$ is too small, IR lifetime reduces, and when too large, sintering characteristic tends to lower, firing temperature tends to increase, sufficient specific permittivity becomes difficult to obtain, and other characteristics tends to deteriorate.

$Gd_2O_3$ has an effect to improve IR lifetime, and it becomes significant when dielectric layer is made to a thin layer, such as 2.0 μm or less. Content of $Gd_2O_3$ is 0.03 or more to less than 0.10 moles, preferably 0.05 to 0.09 moles, more preferably 0.06 to 0.08 moles when calculated as a conversion of $Gd_2O_3$ with respect to 100 moles of main component. When content of $Gd_2O_3$ is too small IR lifetime reduces, and when too large, capacitance-temperature characteristic tends to deteriorate.

In the present invention, as mentioned above, rare earth elements as subcomponent are divided to "Gd element" and "elements ($RE^4$) excluding Gd" and determined amount of said elements are respectively included in the composition. Gd, compared to the other rare earth elements (Y element, for example), is liable to be solid-diffused in $BaTiO_3$ particles of main component. Therefore, even when trace amount of $Gd_2O_3$ is included in the composition, most of Gd will exist in $BaTiO_3$ particles so that the above effects can be sufficiently shown. Further, by allowing content of $RE^4_2O_3$ larger than that of $Gd_2O_3$, $RE^4$ exist not only in $BaTiO_3$ particles but also in grain boundary, which makes it possible to show the above effects sufficiently. As a result, total content of rare earth element oxide ($Gd_2O_3+RE^4_2O_3$) can be relatively small, therefore, it is possible to show high characteristic and reduce firing temperature as well.

$BaZrO_3$ has an effect to improve specific permittivity, dielectric loss, and capacitance-temperature characteristic. Said Gd is solid-dissolved in $BaTiO_3$ particles, therefore, Zr of $BaZrO_3$ will not be diffused inside the $BaTiO_3$ particles and tends to form "Zr included shell-layer" outside the $BaTiO_3$ particles. As a result, $BaZrO_3$ is able to exert the above effect.

In the present embodiment, it is preferable to use in form of $BaZrO_3$, a composite oxide form, as subcomponent. When used in form of BaO and $ZrO_2$ as subcomponent, Zr will be diffused in $BaTiO_3$ particles more than required, which leads to deterioration in IR lifetime.

Content of $BaZrO_3$ is 0.20 to 0.70 moles, preferably 0.30 to 0.65 moles, more preferably 0.40 to 0.60 moles when calculated as a conversion of $BaZrO_3$. When content of $BaZrO_3$ is too small specific permittivity tends to reduce as well as insulation resistance (IR) and IR lifetime tends to deteriorate. On the other hand, when too large, capacitance-temperature characteristic as well as DC bias characteristic tends to deteriorate. Note that $BaZrO_3$ will be detected as or, not as $BaZrO_3$.

Oxide of an element selected from V, Ta, Mo, Nab and W has an effect to improve IR lifetime. Within these oxides, V oxide, especially $V_2O_5$, is preferably used. With respect to 100 miles of main component, content of V, Ta, Mo, Nab and W oxides are 0.02 to 0.15 moles, preferably 0.04 to 0.12 moles, more preferably 0.05 to 0.10 moles when calculated as a conversion of $V_2O_5$, $Ta_2O_5$, $MoO_3$, $Nb_2O_5$ and $WO_3$, respectively. When content of these oxides are too small improvement in reliability (IR lifetime) cannot be attained. On the other hand, when too large, insulation resistance tends to be greatly reduced.

Preferably, in the present embodiment, dielectric ceramic composition of the invention further comprises sintering aid. Said sintering aid can be various compounds which operate as sintering aid. $SiO_2$, $Li_2O$ and $B_2O_3$ can be exemplified as said compounds; however, $SiO_2$ is preferable in the invention. Content of said sintering aid is preferably more than 0.30 to 1.50 moles or less, more preferably 0.40 to 1.25 moles, most preferably 0.50 to 1.00 moles with respect to 100 moles of main component. When content of said sintering aid is too small, sintering of dielectric ceramic composition will be insufficient, and specific permittivity reduces as well as insulation resistance, break-down voltage, and IR lifetime tend to be greatly reduced. On the other hand, when content of said sintering aid is too large, specific permittivity tends to be reduced.

As mentioned, multilayer ceramic capacitor of the second embodiment can be obtained as with the first embodiment, except for changing the composition of the subcomponent.

The same effect can be obtained by the present embodiment with those obtained by the first embodiment.

Hereinbefore, embodiments of the present invention are described, but the present invention is not limited to the above embodiments and can be variously modified within the scope of the present invention.

For example, in the above embodiments, a multilayer ceramic capacitor is exemplified as an electronic device according to the present invention.

However, the electronic device according to the present invention is not limited to the multilayer ceramic capacitor and may be any comprising the dielectric layer constituted by the dielectric ceramic composition produced by the above method.

EXAMPLES

Hereinafter, the present invention will be described based on the further detailed examples, but the present invention is not limited to the examples. In the following examples and comparative examples, each physical property was evaluated as follows.

(Specific Permittivity ∈)

For the capacitor sample, capacitance "C" at reference temperature of 20° C. was measured with digital LCR meter (YHP4274A by Yokokawadenki Corp.) under the conditions of frequency at 120 Hz and input signal level (measured voltage) at 0.5 Vrms/μm. Then, a specific permittivity (no unit) was calculated based on the obtained capacitance "C", the thickness of the dielectric layer in multilayer ceramic capacitor, and over lapping area of internal electrode layers. The higher specific permittivity is more preferable.

(CR Product)

For the capacitor sample, insulation resistance IR was measured with insulation-resistance meter (R8340A by Advantest Co.), after applying DC voltage of 5 V/μm at 20° C. for 1 minute to the capacitor sample. CR product was obtained by multiplying the above capacitance "C" (unit is μF) by insulation resistance IR (unit is MΩ).

(Break-Down Voltage)

Break-down voltage was defined as a value of the voltage at electric current of 10 mA or more when applying a voltage to the capacitor sample. Measured samples were 50 for each composition and their central value was determined as the representative value.

(Capacitance Temperature Characteristic)

Capacitance temperature characteristic was evaluated by X5R and X6S of EIA standard. In concrete, for X5R, capacitance was measured with LCR meter after applying measurement voltage of 0.5 Vrms at −55 to 85° C., and examined whether capacitance change rate satisfies the range of ±15% (standard temperature is 25° C.).

For X6S, capacitance was measured with LCR meter after applying measurement voltage of 0.5 Vrms at −55 to 105° C., and examined whether capacitance change rate is satisfies the range of ±22% (standard temperature is 25° C.).

(DC Bias Characteristic)

First, capacitance was measured when AC voltage of 0.5 Vrms at 120 Hz was applied. Then, capacitance was measured when DC of 2.0V (2 V/μm) and AC voltage of 0.5 Vrms at 120 Hz was applied at the same time. With these measurements, decreasing rate of capacitance was calculated.

(IR Lifetime Test)

For accelerated lifetime test, DC voltage of 10V (10 V/μm) at 150° C. was applied and aged deterioration of its insulation resistance was measured. In accelerated lifetime test, it is determined to be IR lifetime when insulation resistance (IR) value of each sample became $10^4 \Omega$ or less, and an average IR lifetime was obtained from plural samples.

Example 1

$BaTiO_3$ as main component, MgO, MnO, any one of the oxides as $RE^1_2O_3$, $RE^2_2O_3$ and $RE^3_2O_3$, $BaZrO_3$, and oxide of element selected from V, Ta, Mo, Nb, and W as subcomponents, and $SiO_2$ as sintering aid are respectively prepared to obtain dielectric slurry. Note that $BaTiO_3$ having Ba/Ti of 1.000 and c/a of 1.0098 is used. Further, MgO, MnO, any one of the oxides as $RE^1_2O_3$, $RE^2_2O_3$ and $RE^3_2O_3$, $BaZrO_3$ and the oxide of element selected from V, Ta, Mo, Nb, and W were preliminarily calcined.

Compositions of obtained dielectric materials are shown in Tables 1 to 3. Contents of subcomponents are described with respect to 100 moles of main component ($BaTiO_3$). In sample numbers A1 to A5, Ba/Ti was varied. In sample numbers A6 to A9, c/a was varied. In sample numbers A10 to A16, content of MgO as subcomponent was varied In sample numbers A17 to A23, content of MnO was varied.

In sample numbers A24 to A28, content of $BaZrO_3$ was varied. In sample numbers A29 to A34, content of $V_2O_5$ was varied. In sample numbers A35 to A38, V was changed to Ta, Mo, Nb and W. In sample numbers A39 to A44, content of $SiO_2$ was varied.

In sample numbers A45 to A52, $RE^1_2O_3 \geq RE^2_2O_3$ was determined. In sample numbers A53 to A57, $(RE^1_2O_3 + RE^2_2O_3) > RE^3_2O_3$ was determined. In sample number A58, $(RE^1_2O_3 + RE^2_2O_3 + RE^3_2O_3) < 0.3$ was determined. In sample numbers A59 to A64, $0.3 \leq (RE^1_2O_3 + RE^2_2O_3 + RE^1_2O_3) \leq 1.5$ was determined. In sample number A65, $(RE^1_2O_3 + RE^2_2O_3 + RE^3_2O_3) > 0.3$. was determined.

In sample numbers A66 to A69, element was varied without changing the content of $RE^1_2O_3$, $RE^2_2O_3$ and $RE^3_2O_3$. Samples with sign "*" are comparative examples of claim 1 of the invention. Further, numerical values in the table described by slant are values which deviate from the range of the invention.

TABLE 1

| | BaTiO₃ | | MgO | MnO | $(RE^1_2O_3)$ $Gd_2O_3$ | $(RE^2_2O_3)$ $Dy_2O_3$ | $(RE^3_2O_3)$ $Y_2O_3$ | $BaZrO_3$ | $V_2O_5$ | $SiO_2$ |
|---|---|---|---|---|---|---|---|---|---|---|
| No. | Ba/Ti | c/a | mol | mol | mol | mol | mol | mol | mol | mol |
| A 1 | 0.997 | 1.0098 | 2.00 | 0.20 | 0.10 | 0.30 | 0.60 | 0.50 | 0.10 | 1.00 |
| A 2 | 0.999 | 1.0098 | 2.00 | 0.20 | 0.10 | 0.30 | 0.60 | 0.50 | 0.10 | 1.00 |
| A 3 | 1.000 | 1.0098 | 2.00 | 0.20 | 0.10 | 0.30 | 0.60 | 0.50 | 0.10 | 1.00 |
| A 4 | 1.003 | 1.0098 | 2.00 | 0.20 | 0.10 | 0.30 | 0.60 | 0.50 | 0.10 | 1.00 |
| *A 5 | *1.005* | 1.0098 | 2.00 | 0.20 | 0.10 | 0.30 | 0.60 | 0.50 | 0.10 | 1.00 |
| A 6 | 0.998 | 1.0095 | 2.00 | 0.20 | 0.10 | 0.30 | 0.60 | 0.50 | 0.10 | 1.00 |
| A 7 | 0.998 | 1.0096 | 2.00 | 0.20 | 0.10 | 0.30 | 0.60 | 0.50 | 0.10 | 1.00 |
| A 8 | 0.998 | 1.0100 | 2.00 | 0.20 | 0.10 | 0.30 | 0.60 | 0.50 | 0.10 | 1.00 |
| A 9 | 0.998 | 1.0120 | 2.00 | 0.20 | 0.10 | 0.30 | 0.60 | 0.50 | 0.10 | 1.00 |
| *A 10 | 0.998 | 1.0098 | *0.30* | 0.20 | 0.10 | 0.30 | 0.60 | 0.50 | 0.10 | 1.00 |
| A 11 | 0.998 | 1.0098 | 1.00 | 0.20 | 0.10 | 0.30 | 0.60 | 0.50 | 0.10 | 1.00 |
| A 12 | 0.998 | 1.0098 | 1.50 | 0.20 | 0.10 | 0.30 | 0.60 | 0.50 | 0.10 | 1.00 |
| A 13 | 0.998 | 1.0098 | 2.00 | 0.20 | 0.10 | 0.30 | 0.60 | 0.50 | 0.10 | 1.00 |
| A 14 | 0.998 | 1.0098 | 2.50 | 0.20 | 0.10 | 0.30 | 0.60 | 0.50 | 0.10 | 1.00 |
| A 15 | 0.998 | 1.0098 | 3.00 | 0.20 | 0.10 | 0.30 | 0.60 | 0.50 | 0.10 | 1.00 |
| *A 16 | 0.998 | 1.0098 | *3.50* | 0.20 | 0.10 | 0.30 | 0.60 | 0.50 | 0.10 | 1.00 |
| *A 17 | 0.998 | 1.0098 | 2.00 | *0.03* | 0.10 | 0.30 | 0.60 | 0.50 | 0.10 | 1.00 |
| A 18 | 0.998 | 1.0098 | 2.00 | 0.10 | 0.10 | 0.30 | 0.60 | 0.50 | 0.10 | 1.00 |
| A 19 | 0.998 | 1.0098 | 2.00 | 0.20 | 0.10 | 0.30 | 0.60 | 0.50 | 0.10 | 1.00 |
| A 20 | 0.998 | 1.0098 | 2.00 | 0.30 | 0.10 | 0.30 | 0.60 | 0.50 | 0.10 | 1.00 |
| A 21 | 0.998 | 1.0098 | 2.00 | 0.40 | 0.10 | 0.30 | 0.60 | 0.50 | 0.10 | 1.00 |
| A 22 | 0.998 | 1.0098 | 2.00 | 0.50 | 0.10 | 0.30 | 0.60 | 0.50 | 0.10 | 1.00 |
| *A 23 | 0.998 | 1.0098 | 2.00 | *0.60* | 0.10 | 0.30 | 0.60 | 0.50 | 0.10 | 1.00 |

"*" is a comparative example of claim 1 of the invention.

TABLE 2

| | BaTiO₃ | | MgO | MnO | $(RE^1_2O_3)$ $Gd_2O_3$ | $(RE^2_2O_3)$ $Dy_2O_3$ | $(RE^3_2O_3)$ $Y_2O_3$ | $BaZrO_3$ | $V_2O_5$ | $MoO_3$ | $WO_3$ | $Nb_2O_5$ | $Ta_2O_6$ | $SiO_2$ |
|---|---|---|---|---|---|---|---|---|---|---|---|---|---|---|
| No. | Ba/Ti | c/a | mol | mol | mol | mol | mol | mol | mol | mol | mol | mol | mol | mol |
| A 24 | 0.998 | 1.0098 | 2.00 | 0.20 | 0.10 | 0.30 | 0.60 | *0.20* | 0.10 | | | | | 1.00 |
| A 25 | 0.998 | 1.0098 | 2.00 | 0.20 | 0.10 | 0.30 | 0.60 | 0.30 | 0.10 | | | | | 1.00 |
| A 26 | 0.998 | 1.0098 | 2.00 | 0.20 | 0.10 | 0.30 | 0.60 | 0.70 | 0.10 | | | | | 1.00 |
| A 27 | 0.998 | 1.0098 | 2.00 | 0.20 | 0.10 | 0.30 | 0.60 | 1.00 | 0.10 | | | | | 1.00 |

TABLE 2-continued

| | BaTiO$_3$ | | MgO | MnO | (RE$^1_2$O$_3$) Gd$_2$O$_3$ | (RE$^2_2$O$_3$) Dy$_2$O$_3$ | (RE$^3_2$O$_3$) Y$_2$O$_3$ | BaZrO$_3$ | V$_2$O$_5$ | MoO$_3$ | WO$_3$ | Nb$_2$O$_5$ | Ta$_2$O$_6$ | SiO$_2$ |
|---|---|---|---|---|---|---|---|---|---|---|---|---|---|---|
| No. | Ba/Ti | c/a | mol | mol | mol | mol | mol | mol | mol | mol | mol | mol | mol | mol |
| *A 28 | 0.998 | 1.0098 | 2.00 | 0.20 | 0.10 | 0.30 | 0.60 | *1.50* | 0.10 | | | | | 1.00 |
| *A 29 | 0.998 | 1.0098 | 2.00 | 0.20 | 0.10 | 0.30 | 0.60 | 0.50 | *0.03* | | | | | 1.00 |
| A 30 | 0.998 | 1.0098 | 2.00 | 0.20 | 0.10 | 0.30 | 0.60 | 0.50 | 0.05 | | | | | 1.00 |
| A 31 | 0.998 | 1.0098 | 2.00 | 0.20 | 0.10 | 0.30 | 0.60 | 0.50 | 0.15 | | | | | 1.00 |
| A 32 | 0.998 | 1.0098 | 2.00 | 0.20 | 0.10 | 0.30 | 0.60 | 0.50 | 0.20 | | | | | 1.00 |
| A 33 | 0.998 | 1.0098 | 2.00 | 0.20 | 0.10 | 0.30 | 0.60 | 0.50 | 0.25 | | | | | 1.00 |
| *A 34 | 0.998 | 1.0098 | 2.00 | 0.20 | 0.10 | 0.30 | 0.60 | 0.50 | *0.30* | | | | | 1.00 |
| A 35 | 0.998 | 1.0098 | 2.00 | 0.20 | 0.10 | 0.30 | 0.60 | 0.50 | | 0.10 | | | | 1.00 |
| A 36 | 0.998 | 1.0098 | 2.00 | 0.20 | 0.10 | 0.30 | 0.60 | 0.50 | | | 0.10 | | | 1.00 |
| A 37 | 0.998 | 1.0098 | 2.00 | 0.20 | 0.10 | 0.30 | 0.60 | 0.50 | | | | 0.10 | | 1.00 |
| A 38 | 0.998 | 1.0098 | 2.00 | 0.20 | 0.10 | 0.30 | 0.60 | 0.50 | | | | | 0.10 | 1.00 |
| *A 39 | 0.998 | 1.0098 | 2.00 | 0.20 | 0.10 | 0.30 | 0.60 | 0.50 | 0.10 | | | | | *0.30* |
| A 40 | 0.998 | 1.0098 | 2.00 | 0.20 | 0.10 | 0.30 | 0.60 | 0.50 | 0.10 | | | | | 0.40 |
| A 41 | 0.998 | 1.0098 | 2.00 | 0.20 | 0.10 | 0.30 | 0.60 | 0.50 | 0.10 | | | | | 1.50 |
| A 42 | 0.998 | 1.0098 | 2.00 | 0.20 | 0.10 | 0.30 | 0.60 | 0.50 | 0.10 | | | | | 2.00 |
| A 43 | 0.998 | 1.0098 | 2.00 | 0.20 | 0.10 | 0.30 | 0.60 | 0.50 | 0.10 | | | | | 2.50 |
| A 44 | 0.998 | 1.0098 | 2.00 | 0.20 | 0.10 | 0.30 | 0.60 | 0.50 | 0.10 | | | | | 3.00 |

"*" is a comparative example of claim 1 of the invention.

TABLE 3

| | BaTiO$_3$ | | MgO | MnO | RE$^1_2$O$_3$ | | | RE$^2_2$O$_3$ | | RE$^3_2$O$_3$ | | | | BaZrO$_3$ | V$_2$O$_5$ | SiO$_2$ |
| | | | | | Sm$_2$O$_3$ | Eu$_2$O$_3$ | Gd$_2$O$_3$ | Tb$_2$O$_3$ | Dy$_2$O$_3$ | Ho$_2$O$_3$ | Y$_2$O$_3$ | Er$_2$O$_3$ | Yb$_2$O$_3$ | | | |
|---|---|---|---|---|---|---|---|---|---|---|---|---|---|---|---|---|
| No. | Ba/Ti | c/a | mol | mol | mol | mol | mol | mol | mol | mol | mol | mol | mol | mol | mol | mol |
| A 19 | 0.998 | 1.0098 | 2.00 | 0.20 | | | 0.10 | | 0.30 | | 0.60 | | | 0.50 | 0.10 | 1.00 |
| *A 45 | 0.998 | 1.0098 | 2.00 | 0.20 | | | *0.20* | | *0.10* | | 0.60 | | | 0.50 | 0.10 | 1.00 |
| *A 46 | 0.998 | 1.0098 | 2.00 | 0.20 | | | *0.20* | | *0.20* | | 0.60 | | | 0.50 | 0.10 | 1.00 |
| *A 47 | 0.998 | 1.0098 | 2.00 | 0.20 | | *0.20* | | *0.10* | | *0.60* | | | | 0.50 | 0.10 | 1.00 |
| *A 48 | 0.998 | 1.0098 | 2.00 | 0.20 | | | *0.30* | | *0.20* | | 0.60 | | | 0.50 | 0.10 | 1.00 |
| *A 49 | 0.998 | 1.0098 | 2.00 | 0.20 | | | *0.40* | | *0.20* | | 0.80 | | | 0.50 | 0.10 | 1.00 |
| *A 50 | 0.998 | 1.0098 | 2.00 | 0.20 | *0.40* | | | | *0.20* | | | *0.80* | | 0.50 | 0.10 | 1.00 |
| *A 51 | 0.998 | 1.0098 | 2.00 | 0.20 | | | *0.30* | | *0.20* | | 1.00 | | | 0.50 | 0.10 | 1.00 |
| *A 52 | 0.998 | 1.0098 | 2.00 | 0.20 | | | *0.40* | | *0.10* | | | | 1.00 | 0.50 | 0.10 | 1.00 |
| *A 53 | 0.998 | 1.0098 | 2.00 | 0.20 | | | *0.10* | | *0.60* | | 0.60 | | | 0.50 | 0.10 | 1.00 |
| *A 54 | 0.998 | 1.0098 | 2.00 | 0.20 | | *0.10* | | *0.80* | | | | *0.80* | | 0.50 | 0.10 | 1.00 |
| *A 55 | 0.998 | 1.0098 | 2.00 | 0.20 | | | *0.20* | | *0.30* | *0.40* | | | | 0.50 | 0.10 | 1.00 |
| *A 56 | 0.998 | 1.0098 | 2.00 | 0.20 | *0.20* | | | | *0.40* | | | | *0.50* | 0.50 | 0.10 | 1.00 |
| *A 57 | 0.998 | 1.0098 | 2.00 | 0.20 | | | *0.40* | | *0.50* | | *0.80* | | | 0.50 | 0.10 | 1.00 |
| **A 58 | 0.998 | 1.0098 | 2.00 | 0.20 | | | *0.03* | | *0.06* | | *0.20* | | | 0.50 | 0.10 | 1.00 |
| A 59 | 0.998 | 1.0098 | 2.00 | 0.20 | | | 0.10 | 0.20 | | | | 0.50 | | 0.50 | 0.10 | 1.00 |
| A 60 | 0.998 | 1.0098 | 2.00 | 0.20 | | 0.10 | | | 0.40 | 0.70 | | | | 0.50 | 0.10 | 1.00 |
| A 61 | 0.998 | 1.0098 | 2.00 | 0.20 | | | 0.10 | 0.20 | | | 0.30 | | | 0.50 | 0.10 | 1.00 |
| A 62 | 0.998 | 1.0098 | 2.00 | 0.20 | 0.10 | | | | 0.60 | | | | 0.80 | 0.50 | 0.10 | 1.00 |
| A 63 | 0.998 | 1.0098 | 2.00 | 0.20 | | 0.20 | | | 0.40 | | | 0.80 | | 0.50 | 0.10 | 1.00 |
| A 64 | 0.998 | 1.0098 | 2.00 | 0.20 | | 0.20 | | | 0.50 | | | 1.00 | | 0.50 | 0.10 | 1.00 |
| **A 65 | 0.998 | 1.0098 | 2.00 | 0.20 | | | *0.30* | *0.50* | | | *1.00* | | | 0.50 | 0.10 | 1.00 |
| A 66 | 0.998 | 1.0098 | 2.00 | 0.20 | | 0.10 | | 0.30 | | | 0.50 | | | 0.50 | 0.10 | 1.00 |
| A 67 | 0.998 | 1.0098 | 2.00 | 0.20 | 0.10 | | | | 0.30 | 0.50 | | | | 0.50 | 0.10 | 1.00 |
| A 68 | 0.998 | 1.0098 | 2.00 | 0.20 | | 0.10 | 0.30 | | | | | 0.50 | | 0.50 | 0.10 | 1.00 |
| A 69 | 0.998 | 1.0098 | 2.00 | 0.20 | | 0.10 | | | 0.30 | | | | 0.50 | 0.50 | 0.10 | 1.00 |

"*" is a comparative example of claim 1 of the invention.
"**" is a comparative example of claim 2 of the invention.

Then, by using the above-obtained dielectric slurry, a green sheet was formed on a PET film so as to have a thickness of 1.2 μm. Next, the internal electrode paste was printed on the green sheet so as to have a thickness of 1.0 μm, so that the green sheet having the electrode layer was obtained.

For the internal electrode paste, a paste using Ni particles and organic vehicle was used.

A plurality of green sheets having the electrode layer were stacked and adhered by pressure to obtain a green stacking body. The green stacking body was cut in a predetermined size to obtain a green chip.

Then, the obtained green chip was subject to binder removal treatment, firing and annealing in the following conditions, to obtain a multilayer ceramic fired body.

The binder removal treatment was performed at temperature rising rate: 60° C./hour, holding temperature: 300° C., temperature holding time: 8 hours, and atmosphere: in the air.

The firing was performed at temperature rising rate: 200° C./hour, holding temperature: 1150 to 1250° C., temperature holding time: 2 hours, cooling rate: 300° C./hour, and atmosphere gas: wet mixed gas of N$_2$ and H$_2$.

The annealing was performed at holding temperature: 1000 to 110° C., temperature holding time: 2 hours, temperature rising/cooling rate: 200° C./hour, and atmosphere gas: wet $N_2$ gas.

After polishing end faces of the obtained multilayer ceramic fired body with sandblast, In—Ga was coated as an external electrode to obtain a sample of the multilayer ceramic capacitor shown in FIG. 1. The size of the obtained capacitor sample was 2.0 mm×1.25 mm×1.25 mm; the thickness of the dielectric layer was 1.0 μm; a number of laminated dielectric layers were 100; and the thickness of the internal layer was 0.8 μm.

The above characteristics were evaluated for each sample. The results are shown in Tables 3 to 5. Further, numerical values in the tables described by slant are values which deviate from the objective range of the invention.

TABLE 4

| No. | specific permittivity (—) | CR product (ΩF) | break-down voltage (V/μm) | temperature characteristic X5R | temperature characteristic X6S | Bias characteristic (%) | IR lifetime (hr) |
|---|---|---|---|---|---|---|---|
| A 1 | 4300 | 2300 | 150 | −12 | −20 | −31 | 35 |
| A 2 | 4150 | 2400 | 180 | −9 | −14 | −29 | 40 |
| A 3 | 4000 | 2000 | 160 | −10 | −15 | −29 | 30 |
| A 4 | 3800 | 2500 | 140 | −8 | −15 | −28 | 23 |
| * A 5 | *3600* | 2600 | 160 | −6 | −13 | −25 | 16 |
| A 6 | 3750 | 2500 | 140 | −8 | −15 | −28 | 25 |
| A 7 | 3950 | 2550 | 160 | −9 | −15 | −28 | 30 |
| A 8 | 4300 | 2300 | 150 | −12 | −20 | −31 | 35 |
| A 9 | 4450 | 2300 | 180 | −14 | −21 | −34 | 40 |
| * A 10 | 3600 | 1700 | *70* | *20* | *20* | *−42* | 8 |
| A 11 | 3800 | 2000 | 150 | −8 | −15 | −28 | 20 |
| A 12 | 4000 | 2300 | 170 | −10 | −15 | −21 | 33 |
| A 13 | 4250 | 2500 | 190 | −10 | −15 | −30 | 45 |
| A 14 | 4300 | 2600 | 160 | −12 | −20 | −31 | 40 |
| A 15 | 4000 | 2800 | 50 | −15 | −22 | −31 | 30 |
| * A 16 | *3400* | 1800 | 130 | *−18* | *−26* | −25 | 20 |
| * A 17 | 4600 | *1400* | 120 | *−19* | *−30* | *−39* | 7 |
| A 18 | 4400 | 1800 | 140 | −14 | −20 | −33 | 25 |
| A 19 | 4300 | 2200 | 160 | −12 | −20 | −32 | 35 |
| A 20 | 4250 | 2500 | 190 | −10 | −15 | −30 | 45 |
| A 21 | 4200 | 2200 | 170 | −11 | −16 | −31 | 28 |
| A 22 | 3800 | 1800 | 150 | −9 | −14 | −28 | 20 |
| * A 23 | 3600 | *1100* | 120 | −5 | −11 | −25 | 15 |

"*" is a comparative example of claim 1 of the invention.

TABLE 5

| No. | specific permittivity (—) | CR product (ΩF) | break-down voltage (V/μm) | temperature characteristic X5R | temperature characteristic X6S | Bias characteristic (%) | IR lifetime (hr) |
|---|---|---|---|---|---|---|---|
| A 24 | 3550 | *1400* | 150 | −6 | −13 | −23 | 6 |
| A 25 | 3800 | 1800 | 160 | −9 | −15 | −26 | 22 |
| A 26 | 4200 | 2000 | 170 | −13 | −20 | −33 | 33 |
| A 27 | 4500 | 2400 | 150 | −15 | −22 | −35 | 40 |
| * A 28 | 4800 | 2600 | 160 | *−18* | *−28* | *−40* | 40 |
| * A 29 | 4500 | 2800 | 150 | −14 | *−25* | −34 | 8 |
| A 30 | 4400 | 2600 | 160 | −14 | −22 | −32 | 22 |
| A 31 | 4350 | 2500 | 150 | −11 | −20 | −32 | 35 |
| A 32 | 4200 | 2000 | 150 | −9 | −14 | −30 | 40 |
| A 33 | 4000 | 1600 | 130 | −5 | −10 | −28 | 45 |
| * A 34 | 3750 | *1450* | 120 | −4 | −7 | −27 | 50 |
| A 35 | 4500 | 2400 | 140 | −11 | −17 | −32 | 30 |
| A 36 | 4550 | 2500 | 160 | −10 | −16 | −33 | 35 |
| A 37 | 4500 | 2500 | 160 | −12 | −18 | −31 | 32 |
| 38 | 4400 | 2350 | 150 | −10 | −16 | −32 | 38 |
| * A 39 | *3300* | *1300* | *90* | −5 | −10 | −20 | 5 |
| A 40 | 4000 | 2000 | 140 | −10 | −17 | −30 | 15 |
| A 41 | 4400 | 2300 | 150 | −12 | −15 | −32 | 35 |
| A 42 | 3900 | 1950 | 160 | −8 | −14 | −27 | 30 |
| A 43 | 3800 | 1900 | 140 | −7 | −17 | −25 | 28 |
| A 44 | 3500 | 1750 | 150 | −6 | −17 | −23 | 20 |

"*" is a comparative example of claim 1 of the invention.

TABLE 6

| No. | specific permittivity (—) | CR product (ΩF) | break-down voltage (V/μm) | temperature characteristic X5R | temperature characteristic X6S | Bias Characteristic (%) | IR lifetime (hr) |
|---|---|---|---|---|---|---|---|
| A 19 | 4300 | 2200 | 160 | −12 | −20 | −32 | 35 |
| * A 45 | 3700 | 3200 | 180 | *−17* | *−24* | −35 | 20 |
| * A 46 | 3750 | 3000 | 170 | *−18* | *−25* | *−36* | 22 |
| * A 47 | 3650 | 2900 | 160 | *−18* | *−25* | *−36* | 24 |
| * A 48 | 3500 | 3100 | 170 | *−18* | *−26* | *−37* | 18 |
| * A 49 | *3450* | 3000 | 160 | *−18* | *−25* | *−38* | 15 |
| * A 50 | *3400* | 2800 | 150 | *−19* | *−27* | *−39* | 15 |
| * A 51 | *3450* | 2800 | 140 | *−20* | *−28* | *−40* | 12 |
| * A 52 | *3300* | 2500 | 150 | *−20* | *−28* | *−40* | 8 |
| * A 53 | 4850 | 2700 | 150 | *−16* | *−24* | *−39* | 8 |
| * A 54 | 4600 | 2500 | 170 | *−15* | *−23* | *−39* | 8 |
| * A 55 | 4800 | 3200 | 190 | *−18* | *−27* | *−42* | 6 |
| * A 56 | 4750 | 2800 | 160 | *−17* | *−26* | *−41* | 8 |
| * A 57 | 4900 | 3400 | 130 | *−20* | *−32* | *−43* | 4 |
| ** A 58 | 3800 | 2200 | 150 | −8 | −13 | −26 | 4 |
| A 59 | 4300 | 2400 | 180 | −12 | −19 | −31 | 38 |
| A 60 | 4350 | 2300 | 170 | −12 | −18 | −32 | 35 |
| A 61 | 4350 | 2200 | 170 | −13 | −20 | −31 | 35 |
| A 62 | 4000 | 2000 | 180 | −11 | −16 | −29 | 35 |
| A 63 | 3900 | 1850 | 170 | −10 | −15 | −28 | 25 |
| A 64 | 3700 | 1850 | 150 | −9 | −14 | −28 | 15 |
| ** A 65 | 3500 | *1450* | 110 | −8 | −13 | −27 | 8 |
| A 66 | 4200 | 2400 | 170 | −10 | −14 | −29 | 30 |
| A 67 | 4250 | 2600 | 180 | −10 | −15 | −30 | 35 |
| A 68 | 4300 | 2500 | 180 | −11 | −17 | −32 | 32 |
| A 69 | 4150 | 200 | 180 | −10 | −13 | −30 | 38 |

"*" is a comparative example of claim 1 of the invention.
"**" is a comparative example of claim 2 of the invention.

As shown in tables 3 to 5, by making the compositions of dielectric material within the predetermined ranges of the present invention, a capacitor superior in specific permittivity ∈, CR product, break-down voltage, capacitance-temperature characteristic, DC bias characteristic and IR lifetime test can he obtained. On the other hand, when compositions of dielectric material deviate from the predetermined range of the present invention, any one of the above physical property will not satisfy the objective value.

Example 2

$BaTiO_3$ as main component, MgO, MnO, $Y_2O_3$ as $RE^4{}_2O_3$, $Gd_2O_3$, $BaZrO_3$, and oxide of element selected from V, Ta, Mo, Nb, and W as subcomponents, and $SiO_2$ as sintering aid were respectively prepared to obtain dielectric slurry. Note that $BaTiO_3$ having Ba/Ti of 1.000 and c/a of 1.0098 was used. Further, MgO, MnO and $Y_2O_3$ as $RE^4{}_2O_3$, $Y_2O_3$, $Gd_2O_3$, $BaZrO_3$, an oxide of element selected from V, Ta, Mo, Nb, and W were preliminarily calcined.

Compositions of obtained dielectric materials are shown in Tables 7. Contents of subcomponents are described with respect to 100 moles of main component ($BaTiO_3$). In sample numbers B1 to B7, content of Mg as subcomponent was varied. In sample numbers B14 to B18, content of $Y_2O_3$ as $RE^4{}_2O_3$ was varied. In sample numbers B19 to B23, content of $Gd_2O_3$ was varied. In sample numbers B24 to B28, content of $BaZrO_3$ was varied. In sample numbers B29 to B34, content of $V_2O_5$ was varied. In sample numbers B35 to B38, V was changed to Ta, Mo, Nb and W. Samples with sign "*" are comparative example of claim 8 of the invention. Further, numerical values in the tables described by slant are values which deviate from the range of the invention.

TABLE 7

| varied component | Sample No. | BaTiO₃ Ba/Ti | BaTiO₃ c/a | MgO mol | MnO mol | Y₂O₃ mol | Gd₂O₃ mol | BaZrO₃ mol | V₂O₅ mol | MoO₃ mol | WO₃ mol | Nb₂O₅ mol | Ta₂O₅ mol | SiO₂ mol |
|---|---|---|---|---|---|---|---|---|---|---|---|---|---|---|
| MgO content | * B 1 | 1.000 | 1.0098 | *0.30* | 0.20 | 0.60 | 0.06 | 0.40 | 0.08 | | | | | 0.60 |
| | B 2 | 1.000 | 1.0098 | 0.50 | 0.20 | 0.60 | 0.06 | 0.40 | 0.08 | | | | | 0.60 |
| | B 3 | 1.000 | 1.0098 | 1.00 | 0.20 | 0.60 | 0.06 | 0.40 | 0.08 | | | | | 0.60 |
| | B 4 | 1.000 | 1.0098 | 1.50 | 0.20 | 0.60 | 0.06 | 0.40 | 0.08 | | | | | 0.60 |
| | B 5 | 1.000 | 1.0098 | 2.00 | 0.20 | 0.60 | 0.06 | 0.40 | 0.08 | | | | | 0.60 |
| | B 6 | 1.000 | 1.0098 | 2.50 | 0.20 | 0.60 | 0.06 | 0.40 | 0.08 | | | | | 0.60 |
| | * B 7 | 1.000 | 1.0098 | *2.75* | 0.20 | 0.60 | 0.06 | 0.40 | 0.08 | | | | | 0.60 |
| MnO content | * B 8 | 1.000 | 1.0098 | 1.75 | *0.03* | 0.60 | 0.06 | 0.40 | 0.08 | | | | | 0.60 |
| | B 9 | 1.000 | 1.0098 | 1.75 | 0.05 | 0.60 | 0.06 | 0.40 | 0.08 | | | | | 0.60 |
| | B 10 | 1.000 | 1.0098 | 1.75 | 0.10 | 0.60 | 0.06 | 0.40 | 0.08 | | | | | 0.60 |
| | B 11 | 1.000 | 1.0098 | 1.75 | 0.30 | 0.60 | 0.06 | 0.40 | 0.08 | | | | | 0.60 |
| | B 12 | 1.000 | 1.0098 | 1.75 | 0.35 | 0.60 | 0.06 | 0.40 | 0.08 | | | | | 0.60 |
| | * B 13 | 1.000 | 1.0098 | 1.75 | *0.40* | 0.60 | 0.06 | 0.40 | 0.08 | | | | | 0.60 |

TABLE 7-continued

| varied component | Sample No. | BaTiO₃ Ba/Ti | BaTiO₃ c/a | MgO mol | MnO mol | Y₂O₃ mol | Gd₂O₃ mol | BaZrO₃ mol | V₂O₅ mol | MoO₃ mol | WO₃ mol | Nb₂O₅ mol | Ta₂O₅ mol | SiO₂ mol |
|---|---|---|---|---|---|---|---|---|---|---|---|---|---|---|
| RE⁴₂O₃ content | * B 14 | 1.000 | 1.0098 | 1.75 | 0.20 | *0.30* | 0.06 | 0.40 | 0.08 | | | | | 0.60 |
| | B 15 | 1.000 | 1.0098 | 1.75 | 0.20 | 0.40 | 0.06 | 0.40 | 0.08 | | | | | 0.60 |
| | B 16 | 1.000 | 1.0098 | 1.75 | 0.20 | 1.00 | 0.06 | 0.40 | 0.08 | | | | | 0.60 |
| | B 17 | 1.000 | 1.0098 | 1.75 | 0.20 | 1.50 | 0.06 | 0.40 | 0.08 | | | | | 0.60 |
| | * B 18 | 1.000 | 1.0098 | 1.75 | 0.20 | *1.75* | 0.06 | 0.40 | 0.08 | | | | | 0.60 |
| Gd₂O₃ content | * B 19 | 1.000 | 1.0098 | 1.75 | 0.20 | 0.60 | *0.02* | 0.40 | 0.08 | | | | | 0.60 |
| | B 20 | 1.000 | 1.0098 | 1.75 | 0.20 | 0.60 | 0.03 | 0.40 | 0.08 | | | | | 0.60 |
| | B 21 | 1.000 | 1.0098 | 1.75 | 0.20 | 0.60 | 0.05 | 0.40 | 0.08 | | | | | 0.60 |
| | B 22 | 1.000 | 1.0098 | 1.75 | 0.20 | 0.60 | 0.08 | 0.40 | 0.08 | | | | | 0.60 |
| | * B 23 | 1.000 | 1.0098 | 1.75 | 0.20 | 0.60 | *0.10* | 0.40 | 0.08 | | | | | 0.60 |
| BaZrO₃ content | * B 24 | 1.000 | 1.0098 | 1.75 | 0.20 | 0.60 | 0.06 | *0.10* | 0.08 | | | | | 0.60 |
| | B 25 | 1.000 | 1.0098 | 1.75 | 0.20 | 0.60 | 0.06 | 0.20 | 0.08 | | | | | 0.60 |
| | B 26 | 1.000 | 1.0098 | 1.75 | 0.20 | 0.60 | 0.06 | 0.60 | 0.08 | | | | | 0.60 |
| | B 27 | 1.000 | 1.0098 | 1.75 | 0.20 | 0.60 | 0.06 | 0.70 | 0.08 | | | | | 0.60 |
| | * B 28 | 1.000 | 1.0098 | 1.75 | 0.20 | 0.60 | 0.06 | *1.00* | 0.08 | | | | | 0.60 |
| V₂O₅ content | * B 29 | 1.000 | 1.0098 | 1.75 | 0.20 | 0.60 | 0.06 | 0.40 | *0.01* | | | | | 0.60 |
| | B 30 | 1.000 | 1.0098 | 1.75 | 0.20 | 0.60 | 0.06 | 0.40 | 0.02 | | | | | 0.60 |
| | B 31 | 1.000 | 1.0098 | 1.75 | 0.20 | 0.60 | 0.06 | 0.40 | 0.04 | | | | | 0.60 |
| | B 32 | 1.000 | 1.0098 | 1.75 | 0.20 | 0.60 | 0.06 | 0.40 | 0.12 | | | | | 0.60 |
| | B 33 | 1.000 | 1.0098 | 1.75 | 0.20 | 0.60 | 0.06 | 0.40 | 0.15 | | | | | 0.60 |
| | * B 34 | 1.000 | 1.0098 | 1.75 | 0.20 | 0.60 | 0.06 | 0.40 | *0.18* | | | | | 0.60 |
| Additives | B 35 | 1.000 | 1.0098 | 1.75 | 0.20 | 0.60 | 0.06 | 0.40 | | 0.08 | | | | 0.60 |
| | B 36 | 1.000 | 1.0098 | 1.75 | 0.20 | 0.60 | 0.06 | 0.40 | | | 0.08 | | | 0.60 |
| | B 37 | 1.000 | 1.0098 | 1.75 | 0.20 | 0.60 | 0.06 | 0.40 | | | | 0.08 | | 0.60 |
| | B 38 | 1.000 | 1.0098 | 1.75 | 0.20 | 0.60 | 0.06 | 0.40 | | | | | 0.08 | 0.60 |

"*" is a comparative example of claim 8 of the invention.

By using the above-obtained dielectric slurry, sample of multilayer ceramic capacitor as shown in FIG. 1 was obtained as with Example 1.

The above characteristics were evaluated for each sample. The results are shown in Table 8. Further, numerical values in the table described by slant are values which deviate from the objective range of the invention.

TABLE 8

| | specific permittivity (—) | CR product (ΩF) | break-down voltage (V/μm) | temperature characteristic X5R | temperature characteristic X6S | Bias characteristic (%) | IR lifetime (hr) |
|---|---|---|---|---|---|---|---|
| | | | | Objective Characteristic | | | |
| Sample No. | ≧3500 | ≧1500 | ≧100 | within ±15% | within ±22% | ≦−35% | ≧5 h |
| * B 1 | *3000* | 1700 | *70* | 20 | 20 | *−42* | *4* |
| B 2 | 3600 | 1800 | 110 | −6 | −12 | −28 | 18 |
| B 3 | 3850 | 1850 | 120 | −8 | −14 | −29 | 23 |
| B 4 | 4050 | 1900 | 130 | −10 | −15 | −30 | 20 |
| B 5 | 4200 | 2100 | 130 | −10 | −16 | −31 | 18 |
| B 6 | 3750 | 2000 | 150 | −13 | −20 | −27 | 15 |
| * B 7 | *3400* | 1800 | 130 | *−16* | *−24* | −25 | 17 |
| * B 8 | 4450 | *1300* | 110 | −15 | −22 | *−38* | 15 |
| B 9 | 4350 | 1600 | 120 | −14 | −20 | −33 | 20 |
| B 10 | 4350 | 1800 | 140 | −13 | −20 | −32 | 23 |
| B 11 | 4250 | 2000 | 170 | −11 | −16 | −31 | 27 |
| B 12 | 3800 | 1600 | 130 | −9 | −14 | −28 | 22 |
| * B 13 | *3400* | *1200* | 110 | −5 | −11 | −25 | 14 |
| * B 14 | 3700 | 1800 | 130 | −8 | −16 | −27 | *4* |
| B 15 | 3850 | 1700 | 140 | −9 | −16 | −27 | 8 |
| B 16 | 4000 | 2000 | 150 | −10 | −17 | −30 | 25 |
| B 17 | 3700 | 1700 | 130 | −8 | −13 | −26 | 22 |
| * B 18 | *3350* | 1600 | *90* | −4 | −10 | −24 | 12 |
| * B 19 | 3850 | 1800 | 130 | −8 | −14 | −29 | *4* |
| B 20 | 3800 | 1750 | 140 | −8 | −16 | −28 | 14 |
| B 21 | 4300 | 2100 | 130 | −11 | −16 | −32 | 23 |
| B 22 | 4400 | 2000 | 120 | −14 | −22 | −34 | 25 |
| * B 23 | 4450 | 1950 | 140 | *−17* | *−24* | −35 | 23 |
| * B 24 | *3450* | *1400* | 110 | −8 | −13 | −23 | *2* |
| B 25 | 3600 | 1600 | 130 | −9 | −15 | −26 | 18 |
| B 26 | 4300 | 1800 | 140 | −13 | −20 | −33 | 23 |
| B 27 | 4500 | 2300 | 150 | −15 | −22 | −35 | 24 |

TABLE 8-continued

| | specific permittivity | CR product | break-down voltage | temperature characteristic | | Bias characteristic | IR lifetime |
|---|---|---|---|---|---|---|---|
| | (—) | (ΩF) | (V/μm) | X5R | X6S | (%) | (hr) |
| | | | | Objective Characteristic | | | |
| Sample No. | ≧3500 | ≧1500 | ≧100 | within ±15% | within ±22% | ≦−35% | ≧5 h |
| * B 28 | 4800 | 2700 | 150 | −18 | −28 | −40 | 28 |
| * B 29 | 4400 | 2800 | 120 | −14 | −23 | −35 | 3 |
| B 30 | 4350 | 2600 | 120 | −12 | −22 | −32 | 10 |
| B 31 | 4300 | 2400 | 140 | −11 | −20 | −32 | 18 |
| B 32 | 4100 | 1800 | 150 | −9 | −14 | −30 | 25 |
| B 33 | 3800 | 1550 | 140 | −5 | −10 | −28 | 30 |
| * B 34 | 3650 | 1350 | 130 | −4 | −7 | −27 | 32 |
| B 35 | 4400 | 1800 | 120 | −11 | −17 | −33 | 16 |
| B 36 | 4450 | 2300 | 150 | −10 | −16 | −34 | 14 |
| B 37 | 4400 | 2000 | 130 | −12 | −18 | −33 | 16 |
| B 38 | 4300 | 2500 | 140 | −10 | −16 | −33 | 18 |

"*" is a comparative example of claim 8 of the invention.

As shown in table 8, by making the compositions of dielectric material within the predetermined ranges of the present invention, a capacitor superior in specific permittivity ∈, CR product, break-down voltage, capacitance-temperature characteristic, DC bias characteristic and IR lifetime test can be obtained. On the other hand, when compositions of dielectric material deviate from the predetermined range of the present invention, any one of the above physical property will not satisfy the objective value.

Example 3

Samples of multilayer ceramic capacitor were manufactured as with EXAMPLE 2, except composition of dielectric material was determined as shown in Table 9 and their characteristics were examined. In sample numbers B39 to B43, Ba/Ti of $BaTiO_3$, a main component, was varied. In sample numbers B44 to B47, c/a of $BaTiO_3$, a main component, was varied. In sample numbers B48 to B55, a kind of $Re^4{}_2O_3$ was varied. In sample numbers B56 to B60, content of $SiO_2$ as sintering aid was varied. The results are shown in Table 10. Further, numerical values in the tables described by slant are values which deviate from the objective range of the invention.

TABLE 9

| varied component | Sample No. | $BaTiO_3$ | | MgO | MnO | $Ho_2O_3$ | $Y_2O_3$ | $Er_2O_3$ | $Dy_2O_3$ | $Yb_2O_3$ | $Gd_2O_3$ | $BaZrO_3$ | $V_2O_5$ | $SiO_2$ |
|---|---|---|---|---|---|---|---|---|---|---|---|---|---|---|
| | | Ba/Ti | c/a | mol | mol | mol | mol | mol | mol | mol | mol | mol | mol | mol |
| Ba/Ti | ** B 39 | 0.995 | 1.0098 | 1.75 | 0.20 | | 0.60 | | | | 0.06 | 0.40 | 0.08 | 0.60 |
| | B 40 | 0.997 | 1.0098 | 1.75 | 0.20 | | 0.60 | | | | 0.06 | 0.40 | 0.08 | 0.60 |
| | B 41 | 1.000 | 1.0098 | 1.75 | 0.20 | | 0.60 | | | | 0.06 | 0.40 | 0.08 | 0.60 |
| | B 42 | 1.003 | 1.0098 | 1.75 | 0.20 | | 0.60 | | | | 0.06 | 0.40 | 0.08 | 0.60 |
| | ** B 43 | 1.005 | 1.0098 | 1.75 | 0.20 | | 0.60 | | | | 0.06 | 0.40 | 0.08 | 0.60 |
| c/a | ** B 44 | 1.000 | 1.0093 | 1.75 | 0.20 | | 0.60 | | | | 0.06 | 0.40 | 0.08 | 0.60 |
| | B 45 | 1.000 | 1.0095 | 1.75 | 0.20 | | 0.60 | | | | 0.06 | 0.40 | 0.08 | 0.60 |
| | B 46 | 1.000 | 1.0100 | 1.75 | 0.20 | | 0.60 | | | | 0.06 | 0.40 | 0.08 | 0.60 |
| | B 47 | 1.000 | 1.0102 | 1.75 | 0.20 | | 0.60 | | | | 0.06 | 0.40 | 0.08 | 0.60 |
| $RE^4{}_2O_3$ | B 48 | 1.000 | 1.0098 | 1.75 | 0.20 | 0.60 | | | | | 0.06 | 0.40 | 0.08 | 0.60 |
| | B 49 | 1.000 | 1.0098 | 1.75 | 0.20 | | | 0.60 | | | 0.06 | 0.40 | 0.08 | 0.60 |
| | B 50 | 1.000 | 1.0098 | 1.75 | 0.20 | | | | 0.60 | | 0.06 | 0.40 | 0.08 | 0.60 |
| | B 51 | 1.000 | 1.0098 | 1.75 | 0.20 | | | | | 0.60 | 0.06 | 0.40 | 0.08 | 0.60 |
| | B 52 | 1.000 | 1.0098 | 1.75 | 0.20 | | 0.30 | | 0.30 | | 0.06 | 0.40 | 0.08 | 0.60 |
| | B 53 | 1.000 | 1.0098 | 1.75 | 0.20 | 0.30 | 0.30 | | | | 0.06 | 0.40 | 0.08 | 0.60 |
| | B 54 | 1.000 | 1.0098 | 1.75 | 0.20 | | 0.30 | | | 0.30 | 0.06 | 0.40 | 0.08 | 0.60 |
| | B 55 | 1.000 | 1.0098 | 1.75 | 0.20 | 0.30 | | | | 0.30 | 0.06 | 0.40 | 0.08 | 0.60 |
| $SiO_2$ content | B 56 | 1.000 | 1.0098 | 1.75 | 0.20 | | 0.60 | | | | 0.06 | 0.40 | 0.08 | 0.30 |
| | B 57 | 1.000 | 1.0098 | 1.75 | 0.20 | | 0.60 | | | | 0.06 | 0.40 | 0.08 | 0.80 |
| | B 58 | 1.000 | 1.0098 | 1.75 | 0.20 | | 0.60 | | | | 0.06 | 0.40 | 0.08 | 1.20 |
| | B 59 | 1.000 | 1.0098 | 1.75 | 0.20 | | 0.60 | | | | 0.06 | 0.40 | 0.08 | 1.50 |
| | B 60 | 1.000 | 1.0098 | 1.75 | 0.20 | | 0.60 | | | | 0.06 | 0.40 | 0.08 | 1.80 |

"**" is a comparative example of claim 12 of the invention.

TABLE 10

| Sample No. | specific permittivity (—) $\geq 3500$ | CR product ($\Omega$F) $\geq 1500$ | break-down voltage (V/μm) $\geq 100$ | temperature characteristic | | Bias characteristic (%) $\leq -35\%$ | IR lifetime (hr) $\geq 5$ h |
|---|---|---|---|---|---|---|---|
| | | | | X5R within ±15% | X6S within ±22% | | |
| | | | | Objective Characteristic | | | |
| ** B 39 | *4550* | 1800 | *80* | *-19* | *-30* | *-40* | *2* |
| B 40 | 4400 | 2100 | 110 | -15 | -21 | -34 | 15 |
| B 41 | 4350 | 2200 | 140 | -12 | -18 | -31 | 20 |
| B 42 | 3600 | 2400 | 130 | -8 | -15 | -28 | 23 |
| ** B 43 | *3300* | 2600 | 110 | -6 | -13 | -25 | 16 |
| ** B 44 | *3400* | 2700 | 110 | -7 | -14 | -25 | *6* |
| B 45 | 3750 | 2300 | 120 | -9 | -16 | -29 | 15 |
| B 46 | 4300 | 2200 | 120 | -12 | -17 | -32 | 22 |
| B 47 | 4450 | 2300 | 140 | -14 | -20 | -34 | 20 |
| B 48 | 4300 | 1800 | 140 | -12 | -18 | -31 | 21 |
| B 49 | 4200 | 2100 | 130 | -11 | -17 | -30 | 19 |
| B 50 | 4350 | 1900 | 150 | -10 | -18 | -32 | 22 |
| B 51 | 4100 | 2000 | 150 | -12 | -16 | -30 | 23 |
| B 52 | 4250 | 2150 | 130 | -13 | -18 | -31 | 21 |
| B 53 | 4250 | 1950 | 140 | -11 | -17 | -32 | 20 |
| B 54 | 4150 | 2200 | 150 | -11 | -16 | -31 | 24 |
| B 55 | 4300 | 2000 | 140 | -12 | -18 | -32 | 23 |
| ** B 56 | *2800* | *800* | *50* | -5 | -10 | -20 | *<1* |
| B 57 | 4200 | 2000 | 120 | -10 | -17 | -30 | 20 |
| B 58 | 4000 | 2100 | 130 | -9 | -16 | -29 | 22 |
| B 59 | 3750 | 2000 | 130 | -8 | -14 | -26 | 20 |
| ** B 60 | *3400* | 1900 | 140 | -6 | -13 | -23 | 21 |

"**" is a comparative example of claim 12 of the invention.

As shown in table 10, by making Ba/Ti and c/a of main component material and content of $SiO_2$ as sintering aid within the predetermined range of the invention, a capacitor superior in specific permittivity $\in$, CR product, break-down voltage, capacitance-temperature characteristic, DC bias characteristic and IR lifetime test was obtained. The same characteristics were obtained even when a kind of $Re^4{}_2O_3$ was varied or when 2 kinds of $Re^4{}_2O_3$ were combined.

The invention claimed is:

1. A dielectric ceramic composition comprising:
   $BaTiO_3$ as a main component,
   MgO: 0.50 to 3.0 moles,
   MnO: 0.05 to 0.5 moles,
   oxide ($RE^1{}_2O_3$) of element selected from Sm, Eu, and Gd,
   oxide ($RE^2{}_2O_3$) of element selected from Th and Dy,
   oxide ($RE^3{}_2O_3$) of element selected from Y, Ho, Er, Yb, Tm and Lu,
   $BaZrO_3$: 0.20 to 1.0 moles, and
   oxide of element selected from V, Ta, Mo, Nb, and W: 0.05 to 0.25 moles as subcomponents wherein
   each subcomponent is calculated as a conversion of an oxide or composite oxide, with respect to 100 moles of the main component, and
   contents of said $RE^1{}_2O_3$. $RE^2{}_2O_3$ and $RE^3{}_2O_3$ satisfy $RE^1{}_2O_3 < RE^2{}_2O_3$ and $(RE^1{}_2O_3 + RE^2{}_2O_3) \leq RE^3{}_2O_3$.

2. The dielectric ceramic composition as set forth in claim 1 wherein contents of $RE^1{}_2O_3$, $RE^2{}_2O_3$ and $RE^3{}_2O_3$ with respect to 100 moles of the main component satisfy the following:

0.30 moles $\leq (RE^1{}_2O_3 + RE^2{}_2O_3 + RE^3{}_2O_3) \leq 1.50$ moles.

3. The dielectric ceramic composition as set forth in claim 1, further comprising 0.40 to 2.0 moles of sintering aid as a subcomponent with respect to 100 moles of the main component.

4. The dielectric ceramic composition as set forth in claim 1 wherein
   $RE^1$ is Gd,
   $RE^2$ is Dy, and
   $RE^3$ is Y.

5. The dielectric ceramic composition as set forth in claim 1 wherein Ba/Ti, a mole ratio of Ba and Ti in $BaTiO_3$, is 0.997 to 1.003.

6. The dielectric ceramic composition as set forth in claim 1 wherein c/a, a ratio of lattice constant of c-axis and the same of a-axis in crystal lattice of $BaTiO_3$, is 1.0095 or more.

7. An electronic device having a dielectric layer made from dielectric ceramic composition as set forth in claim 1 and internal electrode layers.

8. A dielectric ceramic composition comprising:
   $BaTiO_3$ as a main component,
   MgO: 0.50 to 2.50 moles,
   MnO: 0.05 to 0.35 moles,
   $RE^4{}_2O_3$, $RE^4$ being rare earth element excluding Gd: 0.40 to 1.50 moles,
   $Gd_2O_3$: 0.03 to 0.10 moles, excluding 0.10 moles,
   $BaZrO_3$: 0.20 to 0.70 moles, and
   oxide of element selected from V, Ta, Mo, Nb, and W: 0.02 to 0.15 moles as subcomponents,
   wherein each subcomponent is calculated as a conversion of an oxide or composite oxide, with respect to 100 moles of the main component.

9. The dielectric ceramic composition as set forth in claim 8 wherein $RE^4$ is at least one element selected from Y, Ho, Dy, Er and Yb.

10. The dielectric ceramic composition as set forth in claim 8, further comprising 0.40 to 1.50 moles of sintering aid as a subcomponent with respect to 100 moles of the main component.

11. The dielectric ceramic composition as set forth in claim 10 wherein said sintering aid is at least one selected from oxides of Si, B and Li.

12. The dielectric ceramic composition as set forth in claim 8 wherein Ba/Ti, a mole ratio of Ba and Ti in $BaTiO_3$, is 0.997 to 1.003.

13. The dielectric ceramic composition as set forth in claim 8 wherein c/a, a ratio of lattice constant of c-axis and the same of a-axis in crystal lattice of $BaTiO_3$, is 1.0095 or more.

14. An electronic device having a dielectric layer made from dielectric ceramic composition as set forth in claim 8 and internal electrode layers.

* * * * *